United States Patent [19]
Burckhardt et al.

[11] Patent Number: 5,187,687
[45] Date of Patent: Feb. 16, 1993

[54] PRODUCTION OF IMAGES

[75] Inventors: Christoph B. Burckhardt, Muttenz; Bruno M. J. Dousse, Basle, both of Switzerland

[73] Assignee: Kontron Instruments Holding N.V., Curacao, Netherlands Antilles

[21] Appl. No.: 220,188

[22] Filed: Jul. 18, 1988

Related U.S. Application Data

[63] Continuation of Ser. No. 873,030, Jun. 11, 1986, abandoned.

[30] Foreign Application Priority Data

Jun. 20, 1985 [CH] Switzerland ............... 2622/85

[51] Int. Cl.$^5$ .............. G01N 29/00; G03B 42/00
[52] U.S. Cl. .................................. 367/7; 367/11; 364/413.25; 128/660.01
[58] Field of Search ........... 367/7, 11; 128/660.01; 73/627; 364/413.25

[56] References Cited

U.S. PATENT DOCUMENTS

| | | | |
|---|---|---|---|
| 4,407,293 | 10/1983 | Suarez, Jr. et al. | 128/660 |
| 4,543,826 | 10/1986 | Ferrari | 128/660 |
| 4,604,697 | 10/1986 | Luthra et al. | 364/414 |
| 4,690,150 | 9/1987 | Mayo, Jr. | 128/660 |
| 4,691,707 | 9/1987 | Sankar | 128/660 |

FOREIGN PATENT DOCUMENTS 0146182 6/1985 European Pat. Off. .

OTHER PUBLICATIONS

P. Mohana Shankar et al., IEEE Transactions on Sonics and Ultrasonics, vol. SU-32, No. 4, Jul. 1985, pp. 537-543.
Brown et al., "An Introduction to Synthetic Aperture Radar", IEEE Spectrum vol. 6, (1969) pp. 52-62.
Buckhardt "Speckle in Ultrasound B-Mode Scans", IEEE Trans. on Sonics and Ultrasonics vol. SU-25 (1978) pp. 1-6.
Entrekin et al., "Real time speckle reduction in B-mode images" IEEE 1979 Ultrasonics Symposium Proceedings, (Sep. 26-28, 1979) pp. 169-174.
Magnin et al., "Frequency Compounding for Speckle Contrast Reductions in Phased Array Images", Ultrasonic Imaging, vol. 4 (1982) pp. 267-281.
Magnin, "Coherent speckle in ultrasound images" Hewlett-Packard Journal, vol. 34, No. 10, (1983) pp. 39-40 particularly p. 40, lines 15-44.
Melton, "Parallel-focusing and speckle reduction in medical ultrasonic imaging" IEEE 1980 Ultrasonics Symposium Proceedings, vol. 1/2, 5-7, (1980) pp. 1073-1076.
Shattuck, et al., Ultrasonic Imaging 4, (1982) p. 93-107.
Wells, et al., "Speckle in ultrasonic imaging" Ultrasonics, vol. 19, No. 5, (1981) pp. 225-229.

*Primary Examiner*—Daniel T. Pihulic
*Attorney, Agent, or Firm*—Morgan & Finnegan

[57] ABSTRACT

For reducing speckle in echo signals derived from reflections of pulsed coherent waves, the echo signals are subjected to amplitude and phase/frequency demodulation and the resultant amplitude and phase/frequency data are multiplied to generate an image signal. Selective control of the multiplication process may be provided in accordance with signal amplitude and/or signal-to-noise ratio.

11 Claims, 5 Drawing Sheets

PRODUCTION OF IMAGES

This application is a continuation of application Ser. No. 06/873,030, filed Jun. 11, 1986, now abandoned.

BACKGROUND OF THE INVENTION

This invention relates to a method of producing an image of an area under investigation, in which method wave pulses generated by a pulsed source of coherent waves are transmitted into the area, the echo waves reflected from reflectors in the area are received, and a corresponding electrical echo signal is generated in each case. The invention also relates to apparatus for performing the method.

Amongst methods of the above kind, ultrasound imaging of organs is, for example, increasingly used in medical diagnosis. The advantages of ultrasound imaging over X-ray methods are that non-ionizing radiation is used, that soft tissue can be imaged without contrast agents, that real-time imaging is possible, and that ultrasound equipment is available at a relatively low cost.

Medical ultrasound diagnosis has today reached a level at which widespread clinical use is possible. Image quality, however, is impaired, inter alia, by speckle noise which is marked by a granular appearance of the ultrasound images and which is an obstacle to tissue differentiation. Small structures or interfaces met at an unfavourable angle are unrecognizable because of the image speckle, i.e. a granular structure of an ultrasound image. This is an artefact produced by the coherence of the ultrasound. Speckle is today the main obstacle to the recognition of details in ultrasound images. Because of speckle, the signal-noise ratio of an ultrasound image has a value of only 1.91 (C. B. Burckhardt, "Speckle in Ultrasound B-Mode Scans", IEEE Trans. on Sonics and Ultrasonics, vol. SU-25, 1978 pages 1-6). Speckle thus has an adverse effect on the recognition of small and/or low-contrast structures. e.g. metastases. Various methods therefore have already been proposed in order to reduce speckle but they all have certain disadvantages. The methods used to date and their disadvantages are as follows:

1. Low-pass filtering of image signals

In this method the amplitude of the image signals is averaged over a number of speckle grains, so that the fluctuations of such amplitudes are reduced. This method is hardly used because resolution is reduced as a result.

2. Averaging of the image signals over a plurality of images recorded at different frequencies This is known as the frequency compounding method (P. A. Magnin, O. T. von Ramm, F. L. Thurstone, "Frequency Compounding for Speckle Contrast Reductions in Phased Array Images", Ultrasonic Imaging, vol. 4, 1982, pages 267-281). Since the images are recorded at different frequencies, the speckle in the different images is substantially uncorrelated in this method (depending upon the overlapping of the frequency bands) and the averaged image shows less speckle. However, this method has the following disadvantages:

A wide-band system is required to record images at a plurality of frequencies. Since the ultrasound absorption in the tissue increases with increasing frequency, the number of usuable frequencies is theoretically limited.

The wide-band system could be used to give better longitudinal resolution. Division into a plurality of frequency bands gives a longitudinal resolution less than the maximum possible resolution.

3. Averaging of the image signals over a plurality of images recorded from different directions This is the principle of the compound scan method (C. B. Burckhardt, "Speckle in Ultrasound B-Mode Scans", IEEE Trans. on Sonics and Ultrasonics, vol. SU-25, 1978, pages 1-6; D. P. Shattuck and O. T. von Ramm, Ultrasonic Imaging 4, 1982, pages 93-107). Although this method gives a considerable reduction of speckle and hence a corresponding improvement of image quality it has the following disadvantages:

The complexity of a device for using this method is much greater than the complexity of a normal ultrasound device.

More time is required to record images in different directions, and hence the maximum possible image rate drops.

The structure to be shown must be "visible" to ultrasound over a relatively large angle range, i.e. a larger "ultrasound window" is required than with conventional methods.

Ultrasound imaging is not the only imaging method confronted by the speckle problem. Similar imaging methods operating with coherent radiation, e.g. radar, are also concerned by the problem. Specific mention may be made of "Synthetic Aperture Radar" (W. M. Brown, J. L. Porcello, "An Introduction to Synthetic Aperture Radar". IEEE Spectrum vol. 6, 1969, pages 52-62).

SUMMARY OF THE INVENTION

The object of the invention is to provide a method and apparatus of the above kind by means of which image speckle can be reduced without the above disadvantages of the prior art methods.

To this end, according to the invention, a method is applied which is characterized in that:

a) a first output signal representing the amplitude information of the echo signal is generated by an amplitude demodulation of a signal derived from the echo signal, b) a second signal representing the frequency or phase information of the echo signal is generated by a frequency or phase demodulation of the signal derived from the echo signal, and c) the first and second output signals are combined to generate an image signal which can be displayed by display means to produce the image of the area.

The invention also relates to apparatus for producing an image of an area under examination, which apparatus comprises the following elements:

a pulsed source of coherent waves, and a transducer device which is connected to the source and by means of which wave pulses are transmitted into the area, the echo waves reflected from reflectors in the area are received and a corresponding electrical echo signal is produced in each case, a receiver connected to the transducer device to produce an image signal by processing of the echo signal, and an image display device connected to the receiver.

According to the invention, this apparatus is characterized in that the receiver comprises a circuit having the following structure:

a) a first signal path having an input connected to the transducer device, an amplitude demodulator and an output at which a first output signal is delivered representing the amplitude information of the echo signal, b) a second signal path having an input connected to the input of the first signal path and hence to the transducer device, a frequency or phase demodulator and an output at which there is delivered a second output signal representing the frequency or phase information of the echo signal, and c) a combining circuit having a first input connected to the output of the first signal path, a second input connected to the output of the second signal path, and an output from which can be taken an image signal produced by logic operations on the output signals of the first and second signal paths.

The advantages of the invention are basically that image speckle is reduced with relatively simple means while the disadvantages of the prior art methods are avoided.

BRIEF DESCRIPTION OF THE DRAWINGS

Some exemplified embodiments of the invention will be described below with reference to the accompanying drawings wherein.

DETAILED DESCRIPTION OF THE PREFERRED EMBODIMENTS

Figure 1:
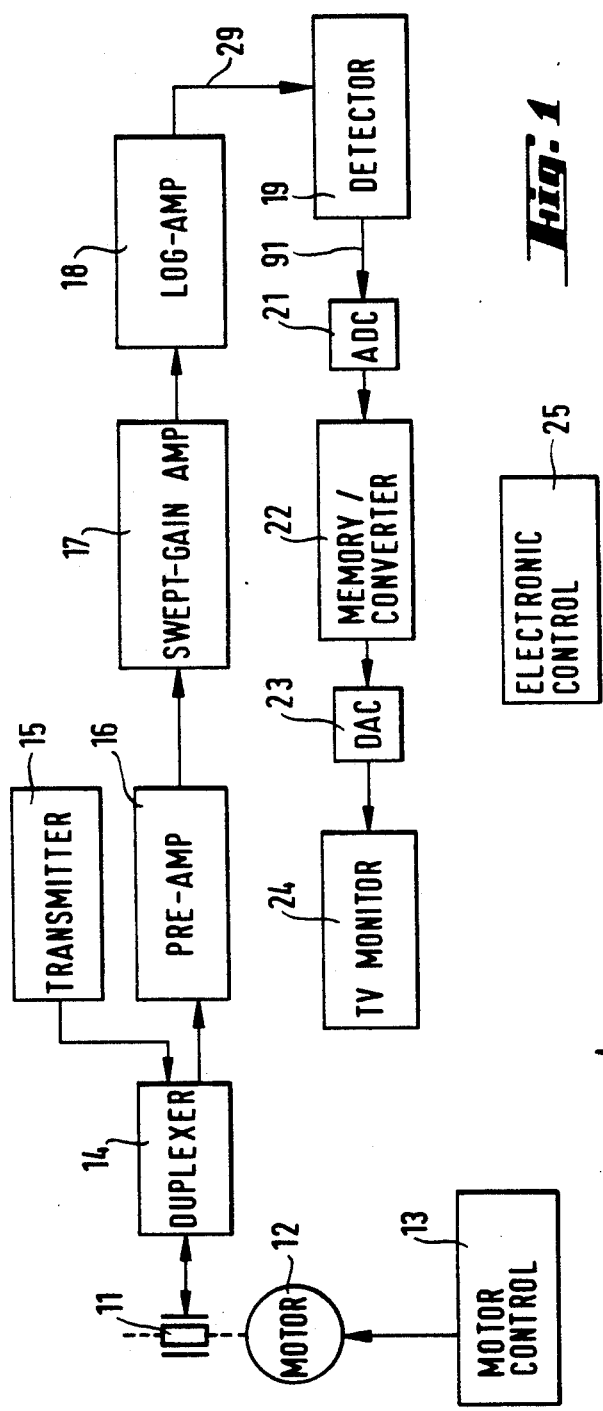
FIG. 1 is a block diagram of an ultrasound device.

FIG. 1 is the block diagram of an ultrasound device; i.e. a mechanical sector scanner. A pulsed transmitter 15 triggers an ultrasound transducer 11 via a duplexer 14. The received signal is fed via the duplexer to a pre-amplifier 16. A swept-gain amplifier 17 following the pre-amplifier 16 has a gain which varies with time and is used to compensate the amplitude drop caused by the tissue attenuation. The amplifier 17 is followed by a logarithmic amplifier 18 which delivers an output signal which is proportional to the logarithm of the input signal over a given range.

Figure 2:
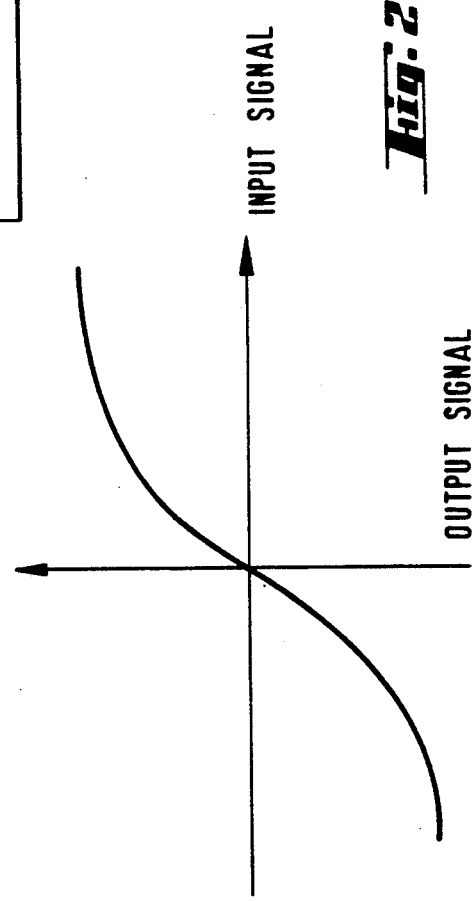
FIG. 2 is a typical characteristic of the logarithmic amplifier 18 of FIG. 1.

The characteristic of the logarithmic amplifier 18 is shown in FIG. 2. From this it will be seen that at a zero input amplitude the output amplitude is also zero, unlike the actual logarithm of the input amplitude, which then assumes the value of infinity. As shown in FIG. 2, the characteristic for negative amplitudes is point-symmetrical to the characteristic for positive input amplitudes.

The output of the logarithmic amplifier 18 is fed via a line 29 to the input of a detector 19. In conventional ultrasound equipment this detector forms an absolute value and carries out low-pass filtration of the output signal of the logarithmic amplifier 18. The output signal of detector 19 is delivered via a line 91. This signal undergoes analog to digital conversion in an analog-digital converter 21. The output signal of converter 21 is intermediately stored in an image memory/standards converter 22. The latter is at the same time read out. The readout signal undergoes digital to analog conversion in a digital/analog converter 23. The output signal of converter 23 is fed as a television standard signal to a TV monitor 24.

Transducer 11 is moved by a motor 12 controlled by a motor control unit 13. The electronic control unit 25 illustrated gives command and synchronizing signals to all the blocks illustrated, via connections not shown.

Figure 3:
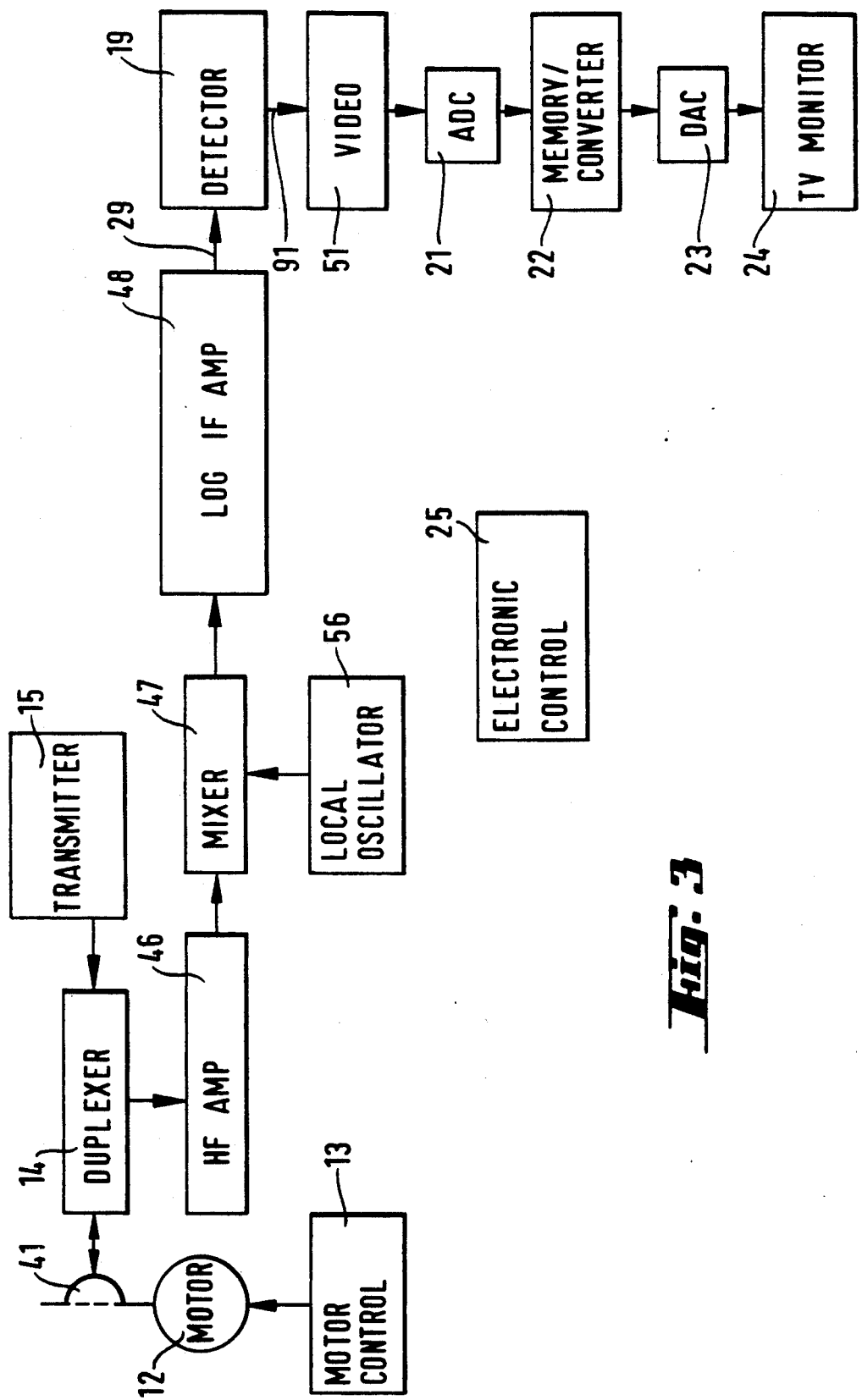
FIG. 3 is a block diagram of a radar device.

FIG. 3. is the block diagram of a radar device. Since this is very similar to that of the ultrasound device shown in FIG. 1, only the differences between these devices will be described. The ultrasound device according to FIG. 1 operates at a frequency in the Megahertz range, while the radar device shown in FIG. 3 operates in the microwave range. Instead of an ultrasound transducer, the radar device has an antenna 41 by means of which electromagnetic wave pulses are radiated and echo waves received. The echo signal amplified by an HF amplifier 46 is converted to a signal in the intermediate frequency range in a mixer 47. For this purpose the mixer receives a carrier frequency signal from a local oscillator 56. Mixer 47 is followed by a logarithmic IF amplifier 48. The characteristic of this amplifier is similar to that of the amplifier 18 in FIG. 1. The IF is typically in the Megahertz range, so that the output of the logarithmic amplifier 48 delivers a signal similar to that at the output of amplifier 18 in FIG. 1.

In the radar device shown in FIG. 3 a video amplifier 51 is provided between the detector 19 and the analog-/digital converter 21. A swept-gain amplifier (known as a sensitivity time control in radar) can be provided between the HF amplifier 46 and the mixer 47. FIG. 3 does not show an amplifier of this kind.

The invention relates more particularly to the construction of the detector 19 in the devices shown in FIGS. 1 and 3.

Figure 4:
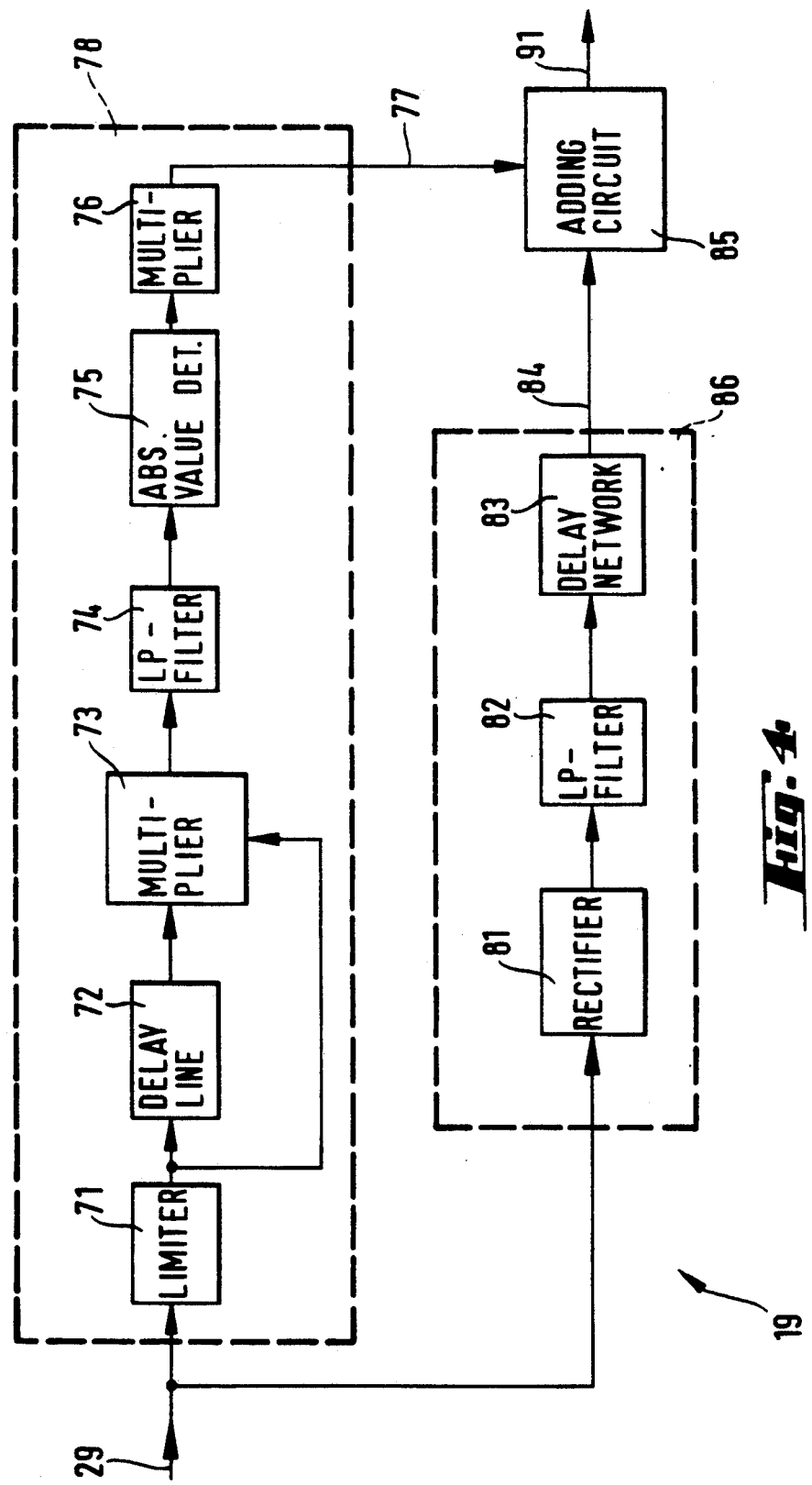
FIG. 4 is a block diagram of a first embodiment of the invention applied to the detector 19 in FIGS. 1 and 3.

FIG. 4 is the block diagram of a first embodiment of a detector 19 according to the invention. This comprises a first signal path 86 and a second signal path 78. The output signals of these two signal paths are added by means of an adding circuit 85. The output signal from this circuit is at the same time the output signal of the detector 19 which is delivered via line 91.

The first signal path 86 is a substantially conventional amplitude demodulator. It comprises the series circuit of a rectifier 81, a low-pass filter 82, and a delay network 83 intended to equalize the delays of the signals through the first and second signal paths.

The second signal path 78 is a frequency or phase demodulator comprising the series circuit of the following blocks:

An amplitude limiter 71, a delay line 72 giving a delay of $T_o/4$, where $T_o$ is the period of the transmission frequency, an integrated circuit (e.g. the National Semiconductor Integrated Circuit LM1496) used as a multiplier 73, by means of which the output signal of limiter 71 and the output signal of the delay line 72 are multiplied, a low-pass filter 74 to eliminate the higher harmonics formed by the multiplication, a circuit 75 for generating an output signal representing the absolute value of the amplitude of the output signal of the low-pass filter 74, and a multiplier 76 by means of which the output signal of circuit 75 is multiplied by a factor K. For any of the echo signals the amplitude of the output signal of the multiplier 76 is proportional to the absolute value of the deviation of the frequency of the echo signal from a reference frequency.

Frequency-dependent attenuation of the tissue causes the echo middle frequency to drop with increasing depth of the reflectors. The transmission frequency $f_o$ should therefore preferably be taken as a reference frequency only when there is a short interval of time between the transmission pulse and the echo. With an increasing time distance between the transmission pulse and the echo the reference frequency should preferably be reduced accordingly. This can be done by increasing the delay of the delay line 72 in FIG. 4 with increasing time. To this end it is possible for use, for example, voltage-controlled capacitors (Varicaps) in a suitable circuit.

Figure 5:
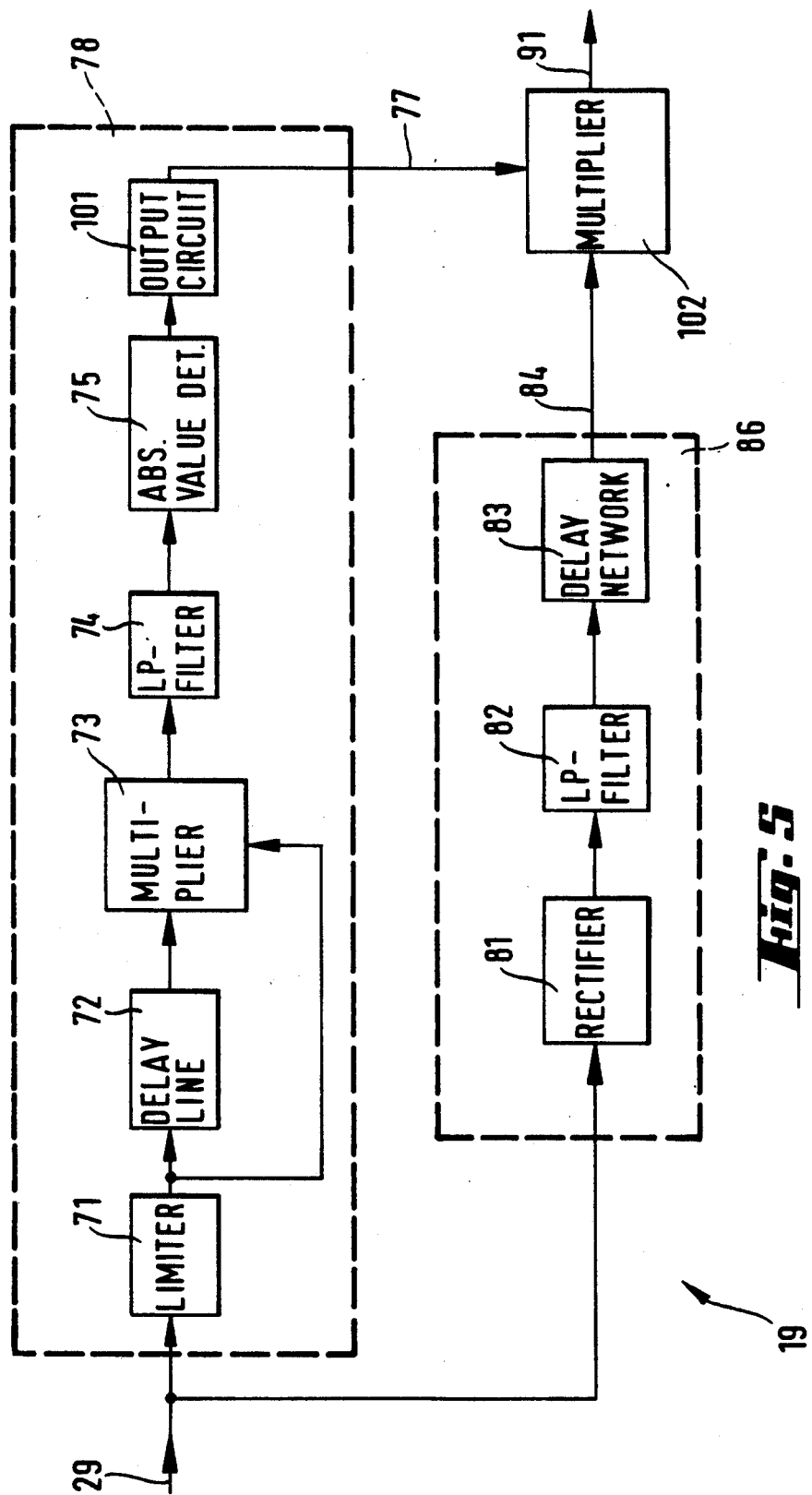
FIG. 5 is a block diagram of a second embodiment of the invention applied to the detector 19 for variants of the devices shown in FIGS. 1 and 3.

FIG. 5 is a block diagram of a second embodiment of a detector 19 according to the invention as shown in FIGS. 1 and 3. This second embodiment is intended for a variant of the ultrasound device shown in FIG. 1 and of the radar device shown in FIG. 3. This variant differs from the devices shown in FIGS. 1 and 3 only in that a linear amplifier is used instead of the logarithmic amplifier 18 or 48, i.e. an amplifier in which the amplitude of the output signal is proportional to the amplitude of the input signal. The differences between the detector shown in FIG. 5 and the detector shown in FIG. 4 are as follows:

Instead of multiplier 76 in FIG. 4 a circuit 101 is used which generates an output signal whose amplitude is a non-linear function of the absolute value $|\Delta f|$ of the deviation of the frequency of the echo signal from a reference frequency. A function of this kind is, for example, an exponentiation with the exponent K. $|\Delta f|$.

Instead of the adding circuit 85 in FIG. 4, an integrated circuit 102 used as a multiplier (e.g. the Motorola integrated circuit MC 1495 L) is used. In this case, therefore, the output signal from detector 19 delivered via line 91 is generated by multiplication of the output signal of the first signal path 86 and the output signal of the second signal path 78.

According to the invention, it is possible to replace the circuit 75 in FIGS. 4 and 5 by a circuit whose characteristic represents an even function, i.e. a function of the form $g(-x)=g(x)$, e.g. $g(x)=x^2$.

Figure 6:
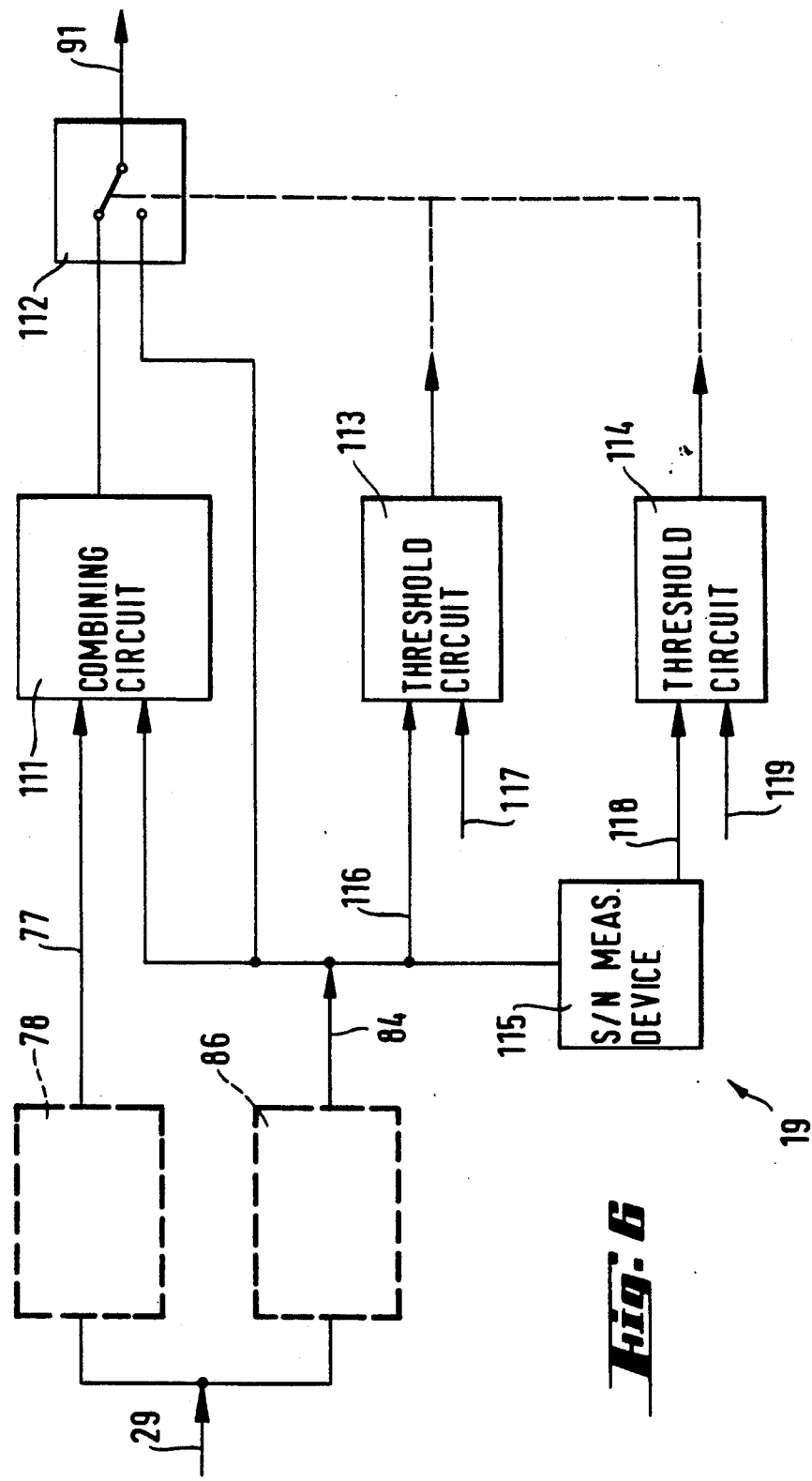
FIG. 6 is a block diagram with preferred additions to the detector 19 shown in FIGS. 4 and 5.

FIG. 6 shows preferred additions to the embodiment of the detector 19 shown in FIGS. 4 and 5. In FIG. 6 the combining circuit 111 represents the adding circuit 85 in FIG. 4 or the multiplier 102 in FIG. 5.

According to a first addition shown in FIG. 6, the detector 19 comprises a circuit 112 which in response to the output signal of a threshold circuit 113 connects either the output of the combining circuit 111 or the output 84 of the first signal path 86 to the output line 91 of the detector 19, via which the latter is connected to the TV monitor 24. An input 116 of the threshold circuit 113 is connected to the output of the first signal path 86. A reference signal corresponding to a first predetermined threshold value is fed to a second input 117 of the threshold circuit 113. When the amplitude of the output signal of the first signal path 86 exceeds the first predetermined threshold value, the corresponding output signal of the threshold circuit 113 causes switch 112 to connect output 84 of the first signal path 86 to the line 91. With the addition just described, only the first signal path 86 of the detector 19 is used for the detector function in the case of echo signals whose amplitude exceeds a predetermined threshold value. This is advantageous because large echo signals generally originate from specular-reflection objects, and such echoes generally do not cause speckle in the image so that the function of the detector 19 according to the invention as shown in FIGS. 4 or 5 is unnecessary for such echoes and may result in deterioration of the longitudinal resolution.

According to a second addition shown in FIG. 6, the detector 19 additionally comprises a second threshold circuit 114 and a device 115 for measuring the signal-noise ratio of the output signal of the first signal path 86. The output of this device is connected to an input 118 of the threshold circuit 114. A reference signal corresponding to a second predetermined threshold value is fed to a second input 119 of the threshold circuit 114. In response to the output signal of the threshold circuit 114 the switch 112 connects either the output of the combining circuit 111 or the output 84 of the first signal path to the line 91. When the amplitude of the output signal of the device 115 falls below the second predetermined threshold value, the corresponding output signal of the threshold circuit 114 causes switch 112 to connect the output of the first signal path 86 to the line 91. With the above-described second addition, only the first signal path 86 is used for echo signals whose signal-noise ratio falls below a predetermined threshold value. This is advantageous because the use of the detector 19 shown in FIGS. 4 or 5 for echo signals of this kind can result in deterioration of the image quality.

There is claimed:

1. In a method of producing an image of an area under investigation, in which method wave pulses having at least one transmission frequency f are generated by a pulsed source of coherent waves and are transmitted into the area, echo waves reflected from reflectors in the area are received, and a corresponding electrical echo signal is generated, an improved process which reduces speckle in said echo signal wherein:
    a) a first output signal related to amplitude information of an echo signal is generated by an amplitude demodulation of a signal derived from the echo signal,
    b) a second output signal related to frequency or phase information of the echo signal is generated by a frequency or phase demodulation of a signal derived from the echo signal, the second output signal amplitude being a non-linear function of an absolute value of a deviation of the frequency of the echo signal from a reference frequency, the reference frequency being variable and lower than said transmission frequency f by a depth correction factor, and
    c) the first and second output signals are multiplied to generate an image signal which can be displayed by a display means to produce an image of the area.

2. In a method of producing an image of an area under investigation, in which method wave pulses having at least one transmission frequency f are generated by a pulsed source of coherent waves and are transmitted into the area, echo waves reflected from reflectors in the area are received, and a corresponding electrical echo signal is generated, an improved process which reduces speckle in said echo signal wherein:
    a) a first output signal related to amplitude information of an echo signal is generated by an amplitude demodulation of a signal derived from the echo signal,
    b) a second output signal related to frequency or phase information of the echo signal is generated by a frequency or phase demodulation of a signal derived from the echo signal, the second output signal amplitude is proportional to an absolute value of a deviation of the frequency of the echo signal from a reference frequency, the reference frequency being variable and lower than said transmission frequency f by a depth correction factor, and c) said first and second output signals are multiplied to generate an image signal which can be displayed by a display means to produce an image of the area.

3. In a method of producing an image of an area under investigation, in which method wave pulses generated by a pulsed source of coherent waves are transmitted into the area, echo waves reflected from reflectors in the area are received, and a corresponding electrical echo signal is generated, an improved process which reduces speckle wherein:

a) a first output signal related to amplitude information of an echo signal is generated by an amplitude demodulation of a signal derived from the echo signal, b) a second output signal related to frequency or phase information of the echo signal is generated by a frequency or phase demodulation of a signal derived from the echo signal, c) said first and second output signals are selectively combined to generate an image signal which can be displayed by a display means to produce an image of the area, and d) a signal corresponding to said first output signal amplitude is compared with a predetermined threshold value and when the amplitude of said first output signal is larger than said threshold value the output signals are not combined and said first output signal is used to form said image signal.

4. In a method of producing an image of an area under investigation, in which method wave pulses generated by a pulsed source of coherent waves are transmitted into the area, echo waves reflected from reflectors in the area are received, and a corresponding electrical echo signal is generated, an improved process which reduces speckle wherein:

a) a first output signal related to amplitude information of an echo signal is generated by an amplitude demodulation of a signal derived from the echo signal, b) a second output signal related to frequency or phase information of the echo signal is generated by a frequency or phase demodulation of a signal derived from the echo signal, c) said first and second output signals are selectively combined to generate an image signal which can be displayed by a display means to produce an image of the area, and d) the signal-to-noise ratio of said first output signal is measured and compared with a predetermined threshold value and when the measured signal-to-noise ratio is less than the threshold value the output signals are not combined and said first output signal is used to form said image signal.

5. In apparatus for producing an image of an area under examination, which apparatus comprises:

a pulsed source of coherent waves, transducer means connected to the source for transmitting wave pulses having at least one transmission frequency f into the area under examination, for receiving echo waves reflected form reflectors in the area, and for producing a corresponding electrical echo signal, receiver processing means connected to the transducer means for producing an image signal by processing the electrical echo signal, an image display device connected to the receiver processing means, means in said receiver for reducing speckle in said electrical echo signal comprising:

a) an amplitude demodulator first signal path having an input connected to the transducer device and an output at which a first output signal is delivered, the first output signal represented amplitude information of the echo signal, b) a frequency or phase demodulator second signal path having an input connected to the input of the first signal path and hence to the transducer device and an output at which a second output signal is delivered, the second output signal representing frequency or phase information of the echo signal, the second signal path being a circuit for generating the second output signal so devised that the second output signal amplitude is a non-linear function of the absolute value of the echo signal frequency deviation from a reference frequency, the reference frequency being variable and lower than said transmission frequency f by a depth correction factor, and c) a multiplier circuit having a first input connected to the output of the first signal path, a second input connected to the output of the second signal path, and an output from which can be taken an image signal produced by multiplying the output signals of the first and second signal paths.

6. In apparatus for producing an image of an area under examination, which apparatus comprises:

a pulsed source of coherent waves, transducer means connected to the source for transmitting wave pulsed having at least one transmitting frequency f into the area under examination, for receiving echo waves reflected from reflectors in the area, and for producing a corresponding electrical echo signal, receiver processing means connected to the transducer means for producing an image signal by processing the electrical echo signal, an image display means, connected to the receiver processing means, means in said receiver for reducing speckle in said electrical echo signal comprising:

a) an amplitude demodulator first signal path having an input connected to the transducer device and an output at which a first output signal is delivered, the first output signal representing amplitude information of the echo signal, b) a frequency or phase demodulator second signal path having an input connected to the input of the first signal path and hence to the transducer device and an output at which a second output signal is delivered, the second output signal representing frequency or phase information of the echo signal, the second signal path comprising a circuit for generating the second output signal so devised that the second output signal amplitude is proportional to an absolute value of an echo signal frequency deviation from a reference frequency, the reference frequency being variable and lower than said transmission frequency f by a depth correction factor, and c) a multiplier circuit having a first input connected to the output of the first signal path, a second input connected to the output of the second signal path, and an output from which can be taken an image signal produced by multiplying the output signals of the first and second signal paths.

7. In apparatus for producing an image of an area under examination, which apparatus comprises:
   a pulsed source of coherent waves,
   transducer means connected to the source for transmitting wave pulses into the area under examination, for receiving echo waves reflected from reflectors in the area, and for producing a corresponding electrical echo signal,
   receiver processing means connected to the transducer means for producing an image signal by processing the electrical echo signal,
   an image display means, connected to the receiver processing means,
   means in said receiver for reducing speckle comprising:
   a) an amplitude demodulator first signal path having an input connected to the transducer device and an output at which a first output signal is delivered, the first output signal representing amplitude information of the echo signal,
   b) a frequency or phase demodulator second signal path having an input connected to the input of the first signal path and hence to the transducer device and an output at which a second output signal is delivered, the second output signal representing frequency or phase information of the echo signal,
   c) a combining circuit having a first input connected to the output of the first signal path, a second input connected to the output of the second signal path, and an output from which can be taken an image signal produced by combining the output signals of the first and second signal paths, and
   d) a threshold switching circuit connected to the first signal path output for connecting either the output of the combining circuit or the output of the first signal path to the image display means, said switching circuit connecting said first signal path output to the image display means when the first output signal amplitude exceeds a predetermined threshold value.

8. In apparatus for producing an image of an area under examination, which apparatus comprises:
   a pulsed source of coherent waves,
   transducer means connected to the source for transmitted wave pulses into the area under examination, for receiving echo waves reflected from reflectors in the area, and for producing a corresponding electrical echo signal,
   receiver processing means connected to the transducer means for producing an image signal by processing the electrical echo signal,
   an image display means connected to the receiver processing means,
   means in said receiver for reducing speckle comprising:
   a) an amplitude demodulator first signal path having an input connected to the transducer device and an output at which a first output signal is delivered, the first output signal representing amplitude information of the echo signal,
   b) a frequency of phase demodulator second signal path having an input connected to the input of the first signal path and hence to the transducer device and an output at which a second output signal is delivered, the second output signal representing frequency or phase information of the echo signal,
   c) a combining circuit having a first input connected to the output of the first signal path, a second input connected to the output of the second signal path, and an output from which can be taken an image signal produced by combining the output signals of the first and second signal paths, and
   d) a threshold switching circuit connected to the first signal path output, and including means for measuring a signal-to-noise ratio of the first output signal, said switching circuit connecting either the first signal path output or the combining circuit to the image display means in dependence upon the relation between said signal-to-noise ratio and a threshold value.

9. In a method of producing an image of an area under investigation, in which method wave pulsed generated by a pulsed source of coherent waves are transmitted into the area, echo waves reflected from reflectors in the area are received, and a corresponding electrical echo signal is generated, an improved signal processing method which processes the electrical echo signal to reduce speckle therein, said method comprising the steps of:
   a) generating a first output signal representing amplitude information of an echo signal by amplitude demodulation of a signal derived from the echo signal,
   b) generating a second output signal representing frequency or phase information of the echo signal by frequency or phase demodulation of the signal derived from the echo signal, and
   c) multiplying said first and second output signals to generate a third electronic signal for producing an image signal which can be displayed by display means to produce the image of the area.

10. In an apparatus for producing an image of an area under examination, which apparatus comprises:
   a pulsed source of coherent waves and a transducer device which is connected to the source and by means of which wave pulses are transmitted into the area, the echo waves reflected from reflectors in the area are received and a corresponding electrical echo signal is produced in each case,
   a receiver connected to the transducer device to produce an image signal by processing of the echo signal, and
   an image display device connected to the receiver, means in said receiver for deriving an imaging forming signal having reduced speckle comprising:
   a) a first signal path having an input connected to the transducer device, an amplitude demodulator, and an output at which a first output signal is delivered representing amplitude information of the echo signal,
   b) a second signal path having an input connected to the input of the first signal path and hence to the transducer device, a frequency or phase demodulator and an output at which there is delivered a second output signal representing frequency or phase information of the echo signal, and c) a multiplying circuit having a first input connected to the output of the first signal path, a second input connected to the output of the second signal path, and an output from which can e taken an electronic image signal produced by multiplying the output signals of the first and second signal paths.

11. A high resolution ultrasonic acoustic system for imaging reflected or scattered signals from a nonhomogenous media supporting acoustic pulse propagation comprising:

a) transmitter means for generating pulse signals;
b) transducer means coupled to said transmitter means for transmitting acoustic pressure signals into said media, and for receiving acoustic pressure signals reflected from said media in response to the transmitted acoustic pressure signal;
c) receiver means coupled to said transducer means for transforming the reflected acoustic pressure signals into electrical signals;
d) means for processing said electrical signals to form an imaging signal constituting the effective product of the detected amplitude modulation of said electrical signals multiplied by the frequency demodulation of said electrical signals; and
e) display means coupled to the output of said processing means and synchronized with said transducer means, for producing cross-sectional images of said media representative of both stationary and moving structures in said media.

* * * * *